(12) United States Patent
Leonard

(10) Patent No.: US 7,116,720 B2
(45) Date of Patent: Oct. 3, 2006

(54) DEVICE FOR CORRECTING STILL IMAGE ERRORS IN A VIDEO SIGNAL

(75) Inventor: Thomas Leonard, Schwerte (DE)

(73) Assignee: Thomson Licensing, Boulogne-Billancourt (FR)

( * ) Notice: Subject to any disclaimer, the term of this patent is extended or adjusted under 35 U.S.C. 154(b) by 727 days.

(21) Appl. No.: 10/398,332

(22) PCT Filed: Sep. 29, 2001

(86) PCT No.: PCT/EP01/11295

§ 371 (c)(1),
(2), (4) Date: Apr. 4, 2003

(87) PCT Pub. No.: WO02/32118

PCT Pub. Date: Apr. 18, 2002

(65) Prior Publication Data

US 2004/0028136 A1 Feb. 12, 2004

(51) Int. Cl.
H04B 1/66 (2006.01)
H04N 7/12 (2006.01)

(52) U.S. Cl. ............................................ 375/240.29
(58) Field of Classification Search .................... None
See application file for complete search history.

(56) References Cited

U.S. PATENT DOCUMENTS

| 5,619,258 A | * | 4/1997 | Gillespie | 348/97 |
| 5,650,816 A | * | 7/1997 | Mead | 348/106 |
| 5,748,231 A | * | 5/1998 | Park et al. | 348/207.99 |
| 5,943,090 A | * | 8/1999 | Eiberger et al. | 348/97 |
| 2003/0103212 A1 | * | 6/2003 | Westphal et al. | 356/479 |

FOREIGN PATENT DOCUMENTS

GB 2 333 413 A * 7/1999

OTHER PUBLICATIONS

Yong Chul Part et al: An Adaptive Motion Decision System For Digital Image Stabilizer Based On Edge Pattern Matching; Consumer Electronics, 1992. Digest of Technical Papers, ICCE., IEEE International Conference On Rosemont, IL, USA Jun. 2-4, 1992, New York, NY, USA.*

Rindtorff H: "Bildstabilisation in Consumer-Camcordern Fumktiound Wirkungsweise" Fernseh Und Kinotechnik, VDE Verlag GMBH.Nberlin, DE, vol. 49, No. 1/2, 1995, pp. 15-18, 20-22, XF000512148, ISSN: 0015-0142, p. 15, right-hand column, line 1-p. 17, middle column, line 30.*

* cited by examiner

Primary Examiner—Nhon Diep
(74) Attorney, Agent, or Firm—Joseph J. Laks; Robert B. Levy; Jorge Tony Villabon

(57) ABSTRACT

In a device for correcting picture instabilities in film scanners, at least one motion vector describing the motion of at least one part of the picture between two scanned pictures is derived and an actuator situated in the path of the video signals obtained by scanning is controlled in a manner dependent on said motion vector, in each case the at least one motion vector of successive pictures being fed to a filter, the filter containing a plurality of registers, to which the at least one motion vector can be fed and which are assigned a state variable which is set if the respective register content is valid, the contents of the registers with a set state variable being accumulated by a new motion vector when the latter arrives, the state variable being reset if the state variable was set before the arrival of the new motion vector and the content of the respective register exceeds a predetermined threshold, the content of one of the registers with a reset state variable being set to zero and the state variable being set to one and an average value being formed from the contents of the registers with a set state variable, said average value being fed to the actuator with an opposite sign.

4 Claims, 2 Drawing Sheets

DEVICE FOR CORRECTING STILL IMAGE ERRORS IN A VIDEO SIGNAL

This application claims the benefit under 35 U.S.C. § 365 of International Application PCT/EP 01/11295filed Sep. 29, 2001, which claims the benefit of German Application No. 100 49 453.6, filed Oct. 6, 2000.

FIELD OF THE INVENTION

The invention relates to an apparatus for correcting picture instabilities in a video signal, having: a device for deriving a correction signal in a manner dependent on deviations in successive pictures of the video signal to be corrected, and an actuator having an input for receiving the video signal to be corrected, a control input for feeding in the derived correction signal and an output for outputting the corrected video signal.

BACKGROUND

During the projection and scanning of films, it is possible to observe picture instabilities resulting from non-uniform transport of the film during recording and/or during projection or scanning. The picture instabilities lead to undesirable motion components which the viewer perceives as disturbing wobbling of the picture.

DE 195 36 691 has disclosed for example a method and an arrangement for correcting picture instabilities during television scanning, in which the picture component in the video signal is corrected with regard to the picture stability by a correction signal. In this case, it is specified specifically how motion vectors are derived by means of a search method which is based on the test displacement of a pattern region from one picture to the next and the determination of a correlation of the pattern region with the corresponding region of the next picture.

However, the derived motion vectors comprise both the picture instabilities and the movements that are actually present, for example movements in the recorded scene or pan movements of the camera. However, these components cannot be unambiguously separated from one another. Therefore, an exact reconstruction of the real motion sequence is not possible.

When viewing the motion present in the scanned picture, it is possible to distinguish between a still picture and a moving picture. In the case of a still picture, picture instabilities are highly pronounced even in the case of a small amplitude. The requirements made of the quality of the correction are particularly high here. The correction signal can be calculated very simply, however, for this case. In order to obtain the course of the path of a pixel, it is necessary merely to continuously sum the displacement vectors. The instantaneous position of the pixel is then obtained. For correction, said pixel is displaced from the instantaneous position to a fixed position in the picture plane.

In the case of moving pictures, picture instabilities with a small amplitude are not so highly pronounced. However, a picture stability correction must not disturb the real motion.

SUMMARY OF THE INVENTION

It is an object of the present invention to specify an apparatus according to the type mentioned in the introduction which is suitable for the correction of picture instabilities both for still pictures and for moving pictures and at the same time largely adapts to the respective requirements for the correction.

This object is achieved according to the invention by virtue of the fact that a filter is provided, which receives, at an input, a motion vector signal describing the vector of a motion between successive pictures, which processes the received motion vector signal according to a predetermined function and which outputs a correction signal at an output.

By inserting a filter into the signal path of a generated motion vector signal, it is possible to significantly improve the picture stability of pictures of a video signal. It is unimportant in this case whether the video signal originates from a portable video camera or as a result of the scanning of a cinema film by a film scanner.

In an advantageous refinement of the invention, it is provided that in each case at least one motion vector (s(k)) of successive pictures is fed to the filter (8), that the filter (8) contains a plurality of registers (Ri(k)), to which at least one motion vector (s(k)) can be fed and which are assigned a state variable (Bi(k)) if the respective register content is valid, that the contents of the registers (Ri(k)) with a set state variable are accumulated by a new motion vector (s(k)) when the latter arrives, that the state variable (Bi(k)) is reset if the state variable was set before the arrival of the new motion vector (s(k)) and the content of the respective register exceeds a predetermined threshold (D), that the content of one of the registers with a reset state variable (Bi(k)) is set to zero and the state variable (Bi(k)) is set to one, and that an average value is formed from the contents of the registers with a set state variable (Bi(k)), said average value being fed to the actuator (9) with an opposite sign.

The device according to the invention has the advantage of correcting small abrupt movements as consequences of the picture instabilities, while movements that do not change abruptly remain largely uninfluenced. Furthermore, movements having a relatively large amplitude, even if they are fast or change their direction quickly, are not corrected. Such movements occur for example during fast pans, scene changes and, if appropriate, during wobbling movements that are desired for dramatic reasons.

BRIEF DESCRIPTION OF THE DRAWINGS

Exemplary embodiments of the invention are illustrated in the drawing using a plurality of figures and are explained in more detail in the description below. In the figures.

DETAILED DESCRIPTION

Figure 1:
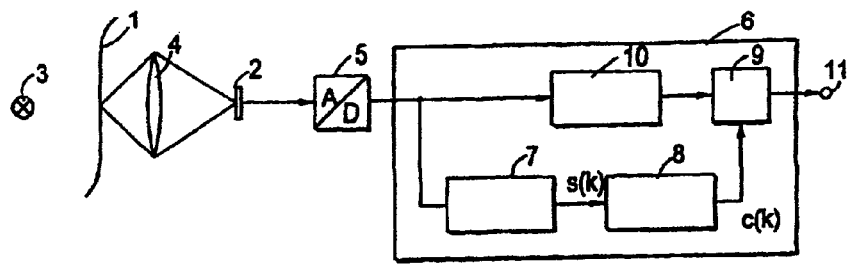
FIG. 1 shows a diagrammatic illustration of a device according to the invention.

In the diagrammatic illustration of a film scanner with a device according to the invention in accordance with FIG. 1, a film 1 is transported at uniform speed past an octoelectronic sensor 2. The sensor 2 is a so-called CCD linear array, for example. During the transport of the film, the light from a lamp 3 transilluminates the film 1. A lens 4 focuses the light penetrating through the film 1 onto the sensor 2.

An analog video signal exhibiting picture instabilities can be tapped off from an output of the sensor 2. Said video signal is fed to an analog/digital converter 5, which outputs at its output a digital video signal which is fed to the device 6 according to the invention for correcting picture instabilities.

For the sake of simplicity, only one color channel is illustrated in FIG. 1, whereas in film scanners it is customary to provide a channel for each color component, which channel can then be corrected in the same way. In this case, the correction signals for the color channels correspond to the correction signal for the luminance channel.

The correction device 6 contains a device 7 for deriving motion vectors, as is described in DE 195 36 691 A1, for example. The motion vectors s(k) are fed to a filter 8, which generates a correction signal c(k) and feeds it to an actuator 9. Since delays occur in the devices 7 and 8 and the correction signal c(k) thus occurs significantly later than the relevant digital video signal, the digital video signals are correspondingly delayed at 10. The corrected video signal can be taken from an output 11.

The actuator 9 essentially comprises a digital memory in which the addresses when writing thereto and reading therefrom differ from one another through in a manner specified by the correction signal c(k).

Figure 2:
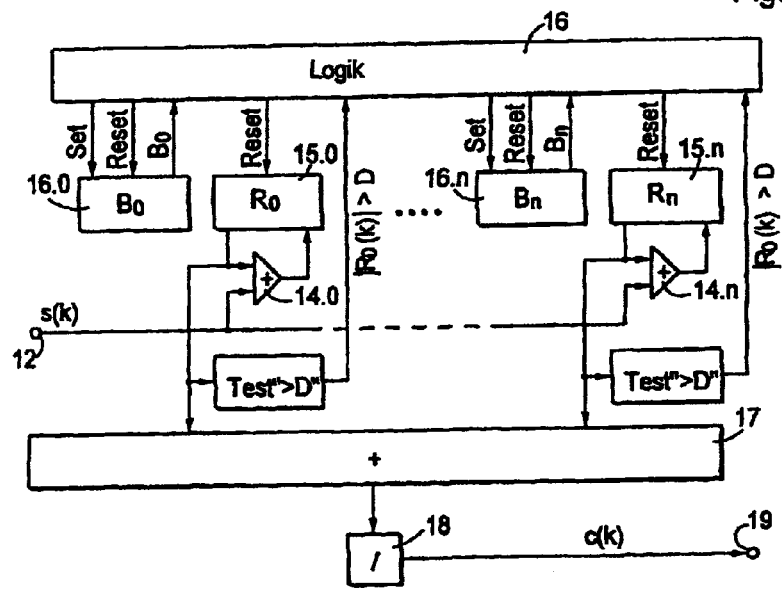
FIG. 2 shows a block diagram of the filter employed in the device according to FIG. 1.

FIG. 2, in a greatly simplified manner, shows the structure of the filter 8 (FIG. 1) for illustration as a block diagram. A realization of the filter according to the invention is preferably provided as a program in a processor, however, which will be explained later in connection with FIG. 4. The motion vectors s(k) are fed to the exemplary embodiment according to FIG. 2 at 12 and added to the contents R_0 to R_n of registers 15.0 to 15.n in adders 14.0 to 14.n. Each register 15.0 to 15.n is assigned a register 16.0 to 16.n, in which a respective state variable B0 to Bn assigned to the respective register content R_0 to R_n is stored.

A logic unit 16 controls the register contents which are added with the aid of an adder 16. In order to form an average value, at 18, the sum is divided by the number of registers used for the addition and multiplied by one. The correction signal c(k) can be taken at 19.

The state variable—also called state bit hereinafter—is set or reset in a manner dependent on the register content and a threshold value D, which will be explained in more detail in connection with FIG. 4.

Figure 3:
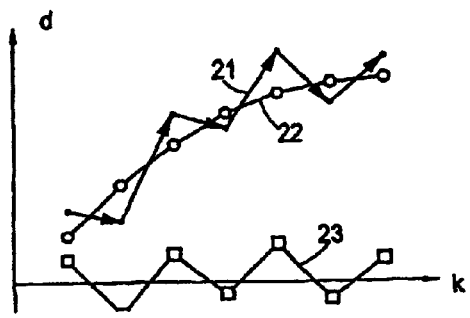
FIG. 3 shows an illustration of different movements of pixels of a scanned film.

FIG. 3 shows the position d of a pixel or an object in the scanned picture as a function of the number of samples. For the sake of clarity, the representation of the motion is restricted to one component. The curve 21 shows a sequence of motion vectors s(k), as is derived by the device 7 (FIG. 1). The curves 22 and 23 represent the proportions of the actual motion (curve 22) and the picture instabilities (curve 23).

Figure 4:
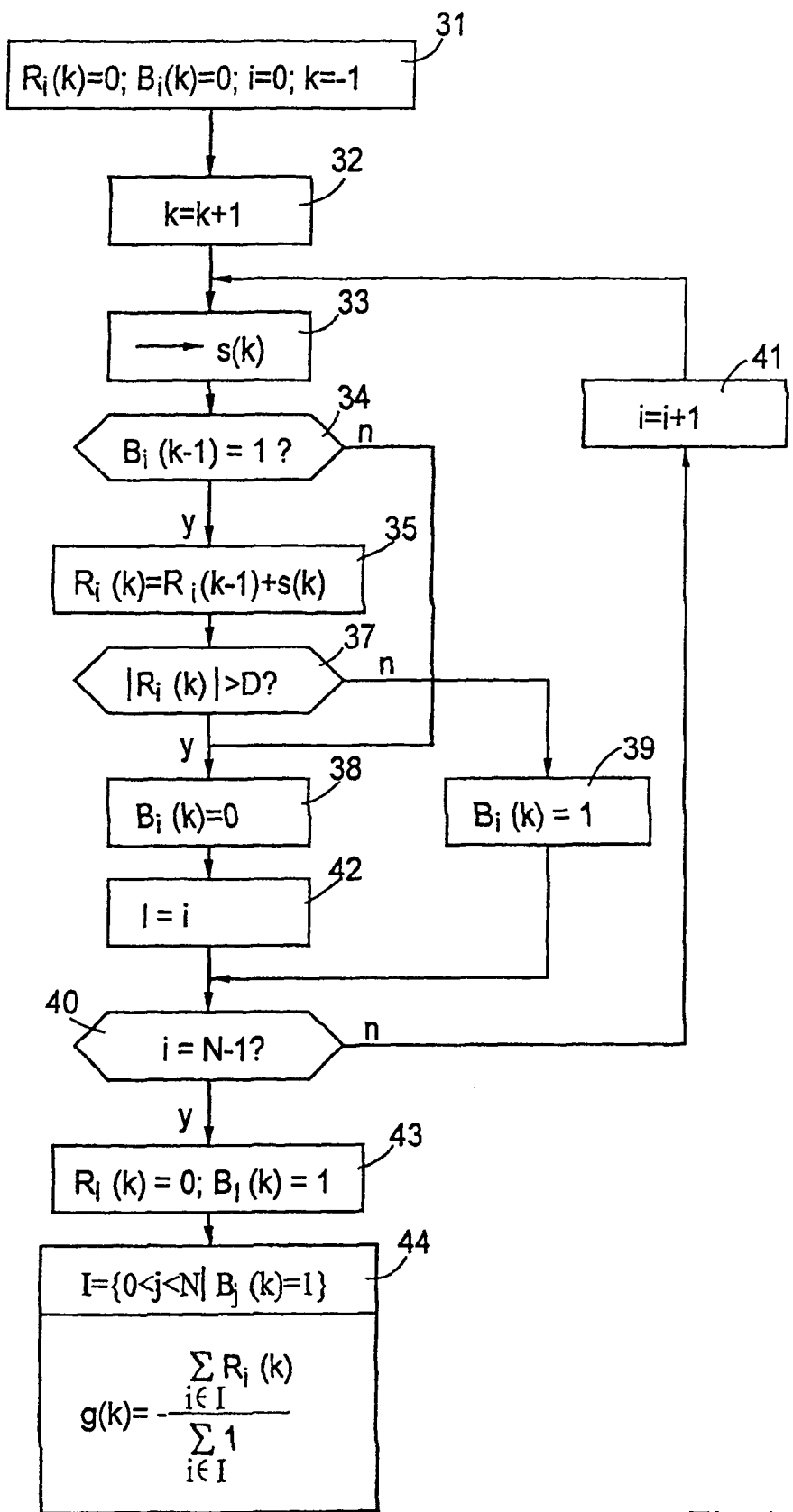
FIG. 4 shows a flow diagram for elucidating the filter according to FIG. 2.

FIG. 4 illustrates the filter algorithm in the form of a flow diagram. The initial state 31 is R_i(k)=0 and Bi(k)=0 with i=0 and k=1. k is incremented at 32, whereupon the motion vector s(k) is read in at 33. At 34, a branch ensues depending on whether Bi(k−1)=1. If this is the case (only after at least one pass), the register content R_i(k) is accumulated at 35.

A check is thereupon made at 35 and 36 to determine whether the state bit Bi(k−1)=1 and whether R_i(k)>D. If both are the case, Bi(k)=0 is set (37). Otherwise, setting to 1 is effected at 38.

A check is made at 39 to determine whether i has already reached the largest value N−1, namely whether all the registers have been addressed. As long as this is not the case, i is incremented at 40 and the program is continued at 31.

At 41, for the first of the registers where Bi(k)=0, the index i is stored as index 1 in order that the register content R_1 and the associated state bit B1(k)–0 can be set at 42. The output signal g(k) is thereupon calculated at 43. To that end, the sum of those register contents for which Bi(k)=1 is formed, and divided by the number of said register contents. Since a displacement vector comprises two components, the filter is realized twice. The result vector then constitutes a correction signal which can be used for reversing the motion sequence and has the components gx(k) and gy(k).

A simple realization of the device according to the invention can be effected by corresponding programming of a processor.

What is claimed is:

1. An apparatus for correcting picture instabilities in a video signal, having a device for deriving a correction signal in a manner dependent on deviations in successive pictures of the video signal to be corrected, having an actuator, which has an input for receiving the video signal to be corrected, a control input for feeding in the derived correction signal and an output for outputting the corrected video signal, having a filter, which receives, at art input a motion vector signal describing the vector of a motion between successive pictures, which derives a correction signal from the received motion vector signal and outputs it at an output, wherein in that in each case at least one motion vector of the successive pictures is fed to the filter, in that the filter contains a plurality of registers to which at least one motion, vector can be fed and which are assigned a state variable if the respective register content is valid, in that the contents of the registers with a set state variable are accumulated by a new motion vector when the latter arrives, in that the state variable is reset it the state variable was set before the arrival of the new motion vector and the content of the respective register exceeds a predetermined threshold, in that the content of one of the registers with a reset state variable is set to zero and the state variable is set to one, and in that an average value is formed from the contents of the registers with a set state variable, said average value being fed to the actuator with an opposite sign.

2. The apparatus as claimed in claim 1, wherein a respective filter is provided for each of the components of the motion vectors.

3. A film scanner comprised of an apparatus for correcting picture instabilities in a video signal as claimed in claim 1.

4. A portable video camera comprised of an apparatus for correcting picture instabilities in a video signal as claimed in claim 1.

* * * * *